United States Patent [19]

Johnson et al.

[11] 4,451,983

[45] Jun. 5, 1984

[54] PLASTIC FLEXIBLE SHAFT SUPPORT

[75] Inventors: Jack E. Johnson, Shreveport; Ronald C. Loyd, Keithville; William Fodness, Shreveport, all of La.

[73] Assignee: Emerson Electric Co., St. Louis, Mo.

[21] Appl. No.: 374,248

[22] Filed: May 3, 1982

Related U.S. Application Data

[63] Continuation of Ser. No. 095,575, Nov. 19, 1979, abandoned.

[51] Int. Cl.³ ............................ A01D 35/26; F16C 1/00
[52] U.S. Cl. ........................................ 30/276; 56/12.7;
464/52; 464/173; 464/178
[58] Field of Search ................... 464/52, 53, 173, 178,
464/57; 30/276, 500; 56/12.7, 17.5, 295;
173/26, 30, 140

[56] References Cited

U.S. PATENT DOCUMENTS

| | | | |
|---|---|---|---|
| 1,960,612 | 11/1978 | Winning | 464/174 |
| 2,884,771 | 5/1959 | Holt | 464/53 |
| 3,190,084 | 6/1965 | Moon et al. | 464/53 |
| 3,340,703 | 9/1967 | Mincuzzi | 464/53 |
| 3,988,078 | 8/1976 | Pittinger, Jr. | 56/12.7 X |
| 4,104,797 | 8/1978 | Ballas | 30/276 |
| 4,126,928 | 11/1978 | Hoff | 464/52 X |
| 4,188,719 | 2/1980 | Hoff | 56/12.7 X |
| 4,226,021 | 10/1980 | Hoff | 464/52 X |
| 4,286,675 | 9/1981 | Tuggle | 464/53 X |
| 4,300,336 | 11/1981 | Miyata | 30/276 X |

FOREIGN PATENT DOCUMENTS 861519 7/1949 Fed. Rep. of Germany ....... 64/2 R

*Primary Examiner*—Stuart S. Levy
*Assistant Examiner*—Daniel P. Stodola
*Attorney, Agent, or Firm*—Hubbard, Thurman, Turner & Tucker

[57] ABSTRACT

A drive shaft assembly for connecting a drive unit to a rotary tool is disclosed. The drive shaft assembly is especially well suited for use in combination with a rotary tool having an axis of rotation at an angle with respect to the axis of the drive unit. The rotary tool and drive unit are supported on an elongated tubular support housing having substantially straight end sections inclined with respect to each other and an intermediate section forming a curved transition from one straight end to the other. A continuous length of tubular liner received within the housing produces a cylindrical bearing surface through at least the curved transition section. The liner provides a yieldable bearing surface having a coefficient of friction substantially less than that of the housing surface. A flexible drive shaft extends through the liner and support housing and is received in rotary sockets coupled to the rotary tool and drive unit, respectively. A tubular shroud is connected to one end of the support housing with a coupling stub carrying a socket journalled for rotation within the shroud. The coupling shaft and flexible drive shaft carry mutually engagable socket and drive head portions. Each head portion is axially movable in the socket, and the socket and head are provided with overlapping torque transmitting surface areas throughout a predetermined range of axial movement of the drive head relative to the socket. According to this arrangement, the flexible drive shaft is free to expand and contract without interference in response to torque variations.

4 Claims, 5 Drawing Figures

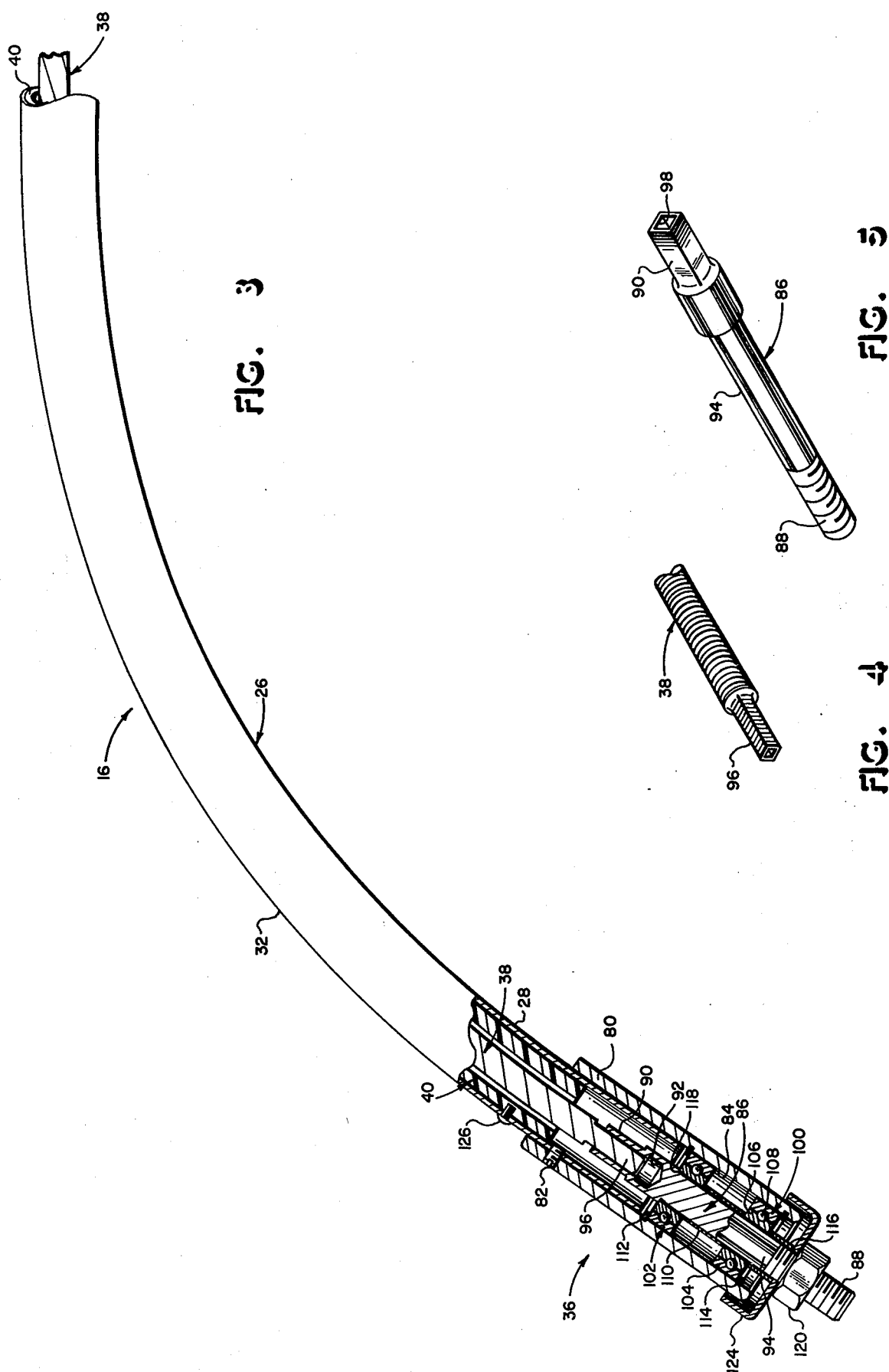

PLASTIC FLEXIBLE SHAFT SUPPORT

This application is a continuation of application Ser. No. 95,575, filed: Nov. 19, 1979, now abandoned.

BACKGROUND OF THE INVENTION

1. Field of the Invention

This invention relates generally to portable power tools, and in particular to a drive shaft assembly for transmitting torque from a power unit to a rotary attachment such as a monofilament line trimmer.

2. Description of the Prior Art

It is well known in the prior art to provide an internal combustion engine for driving portable power tools such as flexible line trimmers, lawn edgers, brush cutters and the like. In the typical prior art arrangement, the rotary head of the power tool is connected by means of a flexible drive shaft enclosed within a long tubular housing and is connected in driving relation at the opposite end to the internal combustion engine. The tubular housing is relatively long as compared to the length of the power handle and is slightly curved at its end to maintain the cutter head at a preferred cutting angle with respect to the longitudinal axis of the engine housing. This arrangement permits the assembly to be carried and manipulated comfortably by an operator in an erect standing or walking position. Because the lower end of the drive shaft transitions through an arc to produce the desired angular relationship, a flexible drive shaft must be used to negotiate the arc for efficiently transmitting power from the engine to the rotary head.

A problem inherent in this curved drive shaft arrangement is that of "whipping" of the flexible drive shaft against its tubular housing enclosure which causes premature wear and failure. This problem has been alleviated somewhat by such techniques as enclosing the flexible drive shaft within a steel sheath, and by supporting the flexible drive shaft at a number of axially spaced stations throughout the tubular housing by annular bushings. Neither approach has been completely satisfactory for a number of reasons. For example, the metal liner or sheath imposes a substantial friction load which causes premature failure because of thermal cycling and abrasive wear against the metal liner surface. Additionally, this arrangement is objectionable because of the noise produced by the metal-to-metal contact as the flexible drive shaft rotates. The spaced bushing assembly represents an improvement over the metal sheath insofar as noise level and wear are concerned; however, the initial placement of the bushings at the proper locations within the curved, tubular housing is a difficult operation, and the insertion of a replacement flexible drive shaft in the curved tubular housing is extremely difficult and requires the removal and replacement of the bushings within the curved section. Additionally, because of the spacing between bushings throughout the curved section, a substantial amount of "whipping" occurs in the curved section at high speed operation.

OBJECTS OF THE INVENTION

It is therefore a general object of the invention to provide an improved drive shaft assembly which will eliminate or minimize problems of the type previously described, and which is a universal drive shaft assembly which can be used in combination with a number of attachments to accomplish specific functions or tasks.

It is another object of the present invention to provide an improved drive shaft assembly of the type suitable for driving a rotary head through an elongated, curved drive shaft support housing which can be easily assembled or disassembled for inspection and repair.

Yet another object of the present invention is to provide a drive shaft assembly having a liner element which forms an initial assembly of a bending support to promote smooth curvature of the housing and to prevent collapse or distortion during a bending operation.

Still another object of this invention is to provide a low noise drive shaft assembly.

It is another object of the present invention to provide a drive shaft assembly having a yieldable liner which provides continuous bearing support along the length of a support housing.

It is a related object of the present invention to provide an improved drive shaft assembly having a liner element providing a continuous bearing surface along the length of a curved support housing, and through which a flexible drive shaft can be withdrawn and reinserted without structural modification and without the use of special tooling.

Another object of the present invention is to provide an improved coupling assembly for connecting a flexible drive shaft to a rotary tool.

It is still another object of the present invention to provide an improved drive connector on opposite ends of a tubular support housing which permits a flexible drive shaft to expand and contract without interference in response to torque variations while efficiently transmitting torque from a drive unit to a rotary tool.

Another object of the present invention is to extend the life of a flexible drive shaft by supporting it continuously along its length while permitting it to expand and contract in response to torque variations simultaneously as it transmits torque.

SUMMARY OF THE INVENTION

The foregoing objects are achieved by a drive shaft assembly which is especially well suited for connecting a drive unit to a rotary tool supported by an elongated support housing at a substantial distance from the drive unit. The drive shaft assembly is especially well suited for use in combination with a rotary tool having its axis of rotation at an angle with respect to the axis of the drive unit. The rotary tool and drive unit are supported on an elongated tubular support housing having substantially straight end sections inclined with respect to each other and an intermediate section forming a curved transition from one straight end to the other. A continuous length of yieldable tubular liner lodged within the support housing produces a cylindrical bearing surface through at least the curved transition section and preferably throughout the entire length of the support housing. The liner provides a yieldable bearing surface having a coefficient of friction substantially less than that of the housing surface. A flexible drive shaft extends through the liner and support housing and is received in rotary sockets coupled to the rotary tool and drive unit, respectively. A tubular shroud is connected to one end of the support housing with a coupling stub carrying a socket journalled for rotation within the shroud. The coupling shaft and flexible drive shaft carry mutually engagable socket and drive head portions. Each drive head portion is axially movable in the socket, and the socket and head are provided with overlapping torque transmitting surface areas throughout a predetermined range of axial movement of the drive head relative to the socket. According to this arrangement, the flexible drive shaft is free to expand and contract without interference in response to torque variations.

The novel features which characterize the invention are defined by the appended claims. The foregoing and other objects, advantages and features of the invention will hereinafter appear, and for purposes of illustration of the invention, but not of limitation, an exemplliary embodiment of the invention is shown in the appended drawing.

BRIEF DESCRIPTION OF THE DRAWING

FIG. 3 is an elevation view, partly in section, of the curved end of the drive shaft assembly of the invention, including construction details of the lower coupling assembly;

FIG. 4 is a perspective view of a portion of a flexible drive shaft; and,

FIG. 5 is a perspective view of the coupling stub of the invention.

DESCRIPTION OF THE PREFERRED EMBODIMENT

Figure 1:
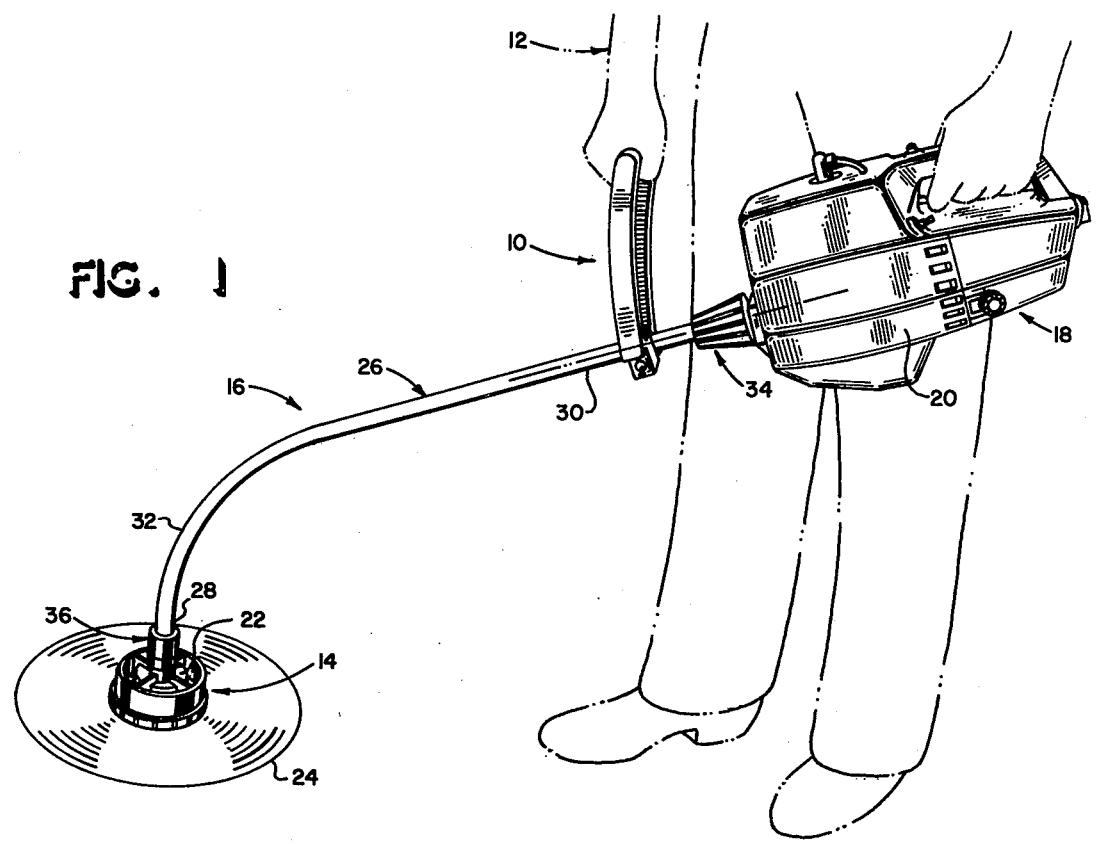
FIG. 1 is a perspective view of a portable line trimmer power tool which incorporates a drive shaft assembly constructed according to the teachings of the invention.

In the description which follows, like parts are marked throughout the specification and drawing with the same reference numerals, respectively.

The drawings are not necessarily to scale and in some instances, structural portions have been exaggerated in order to more clearly depict certain features of the invention.

The invention will be described in connection with a preferred embodiment of an internal combustion engine powered line trimmer assembly 10 as shown in FIG. 1. However, the inventive features are applicable to power tools in general, including those driven by an electric drive motor, and comprehend a number of different uses wherein a rotary head is fitted with a blade or other rotary implement such as commonly used for edgers, brush cutters, mini-tillers, snow blowers, circular saws, chain saws, water pumps, generators, air compressors, etc., and for reciprocating implements such as power hacksaws, hedge clippers and the like. Therefore, for purposes of illustration, and not of limitation, the preferred embodiment of a filament-type, flexible line trimmer will be described in detail for illustration of the novel features of the invention.

Referring again to FIG. 1, the flexible line trimmer 10 is a portable, lightweight assemby which is easily manipulated by an operator 12 for trimming grass and weeds growing close to walls, fences, walks, shrubs and trees, where access with a conventional lawn mower is awkward or impossible. The line trimmer assembly 10 includes a rotary cutter head 14 which is coupled to the lower end of an elongated tubular drive shaft assembly 16. Coupled in driving relation on the upper end of the drive shaft assembly 16 is a power handle assembly 18. As used in this specification, the term "power handle assembly" shall include a drive motor or engine having a fitting for transmitting power through a rotatable shaft and the housing enclosing the drive motor.

The power handle assembly 18 preferably comprises a housing 20 which encloses an internal combustion engine (not shown) which is capable of delivering high torque at relatively low speeds during extended or continuous operation. Power developed by the internal combustion engine is transmitted to the rotary cutter head 14 through the flexible drive shaft assembly 16 in a manner which will be disclosed hereinafter.

The rotary head 14 includes a spool 22 and a length of flexible filament line 24 carried by the spool for cutting vegetation as the spool rotates. The drive shaft assembly 16 is relatively long as compared to the length of the power handle 18 and is slightly curved at its end to maintain the cutter head 14 at a preferred cutting angle with respect to the longitudinal axis of the power handle assembly. This arrangement permits the line trimmer assembly 10 to be carried comfortably by the operator in an erect standing or walking position. This angular relationship is provided by bending the lower portion of the drive shaft assembly 16 through a suitable arc, and by transmitting power from the power handle assembly to the rotary head by means of a flexible drive shaft.

Figure 2:
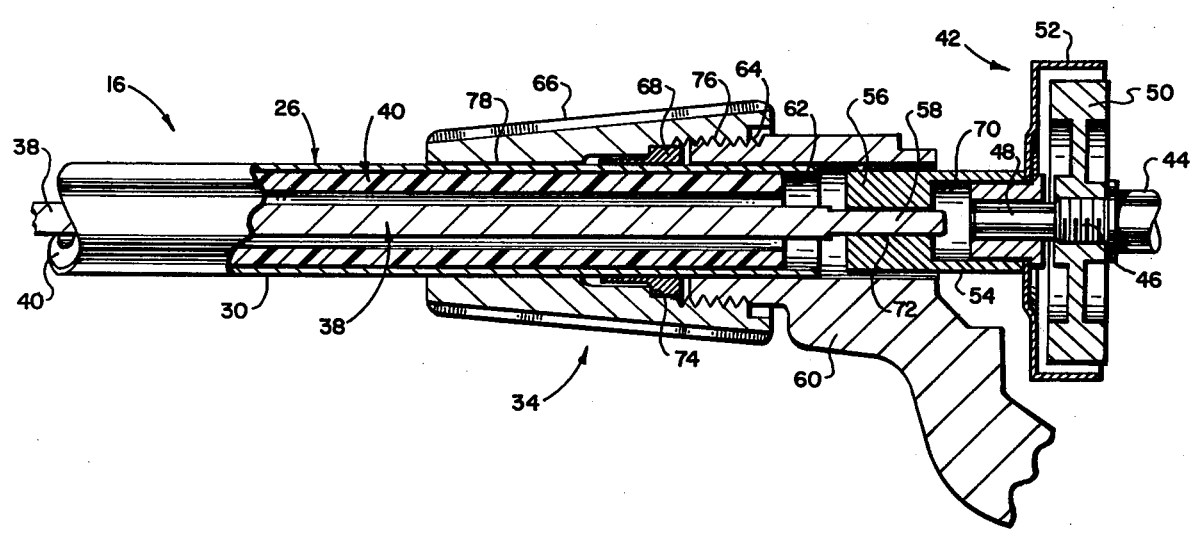
FIG. 2 is a partial view, partly in elevation and partly in section, which illustrates the upper coupling structure.

Referring now to FIGS. 1 and 2, the drive shaft assembly 16 comprises an outer tubular support housing 26 preferably formed of a high strength, bendable metal such as extruded aluminum. The tubular support housing 26 is provided with substantially straight end sections 28, 30 which are inclined with respect to each other and an intermediate section 32 forming a curved transition from one straight end section to the other. The support housing 26 is coupled at its upper end 30 to the power handle assembly 18 by an upper coupling assembly 34 and at its lower straight end 28 by a lower coupling assembly 36.

Rotary torque is transmitted from the power handle assembly to the rotary head 14 through a flexible drive shaft 38 which extends through the straight and curved support sections. According to an important feature of the invention, the flexible drive shaft 38 is stabilized by a continuous length of tubular liner 40 which is substantially coextensive in length with the tubular support housing 26. The tubular liner 40 is preferably formed of a yieldable bearing material having a coefficient of friction between the liner and the drive shaft 38 which is substantially less than the coefficient of friction between the support housing and the drive shaft. The liner 40 is preferably formed by extruding a mixture of a polymer such as polyvinyl chloride, plasticizer and ash to form a continuous tube. Alternatively, the liner may comprise nylon or other durable plastic material impregnated with a powdered lubricant such as molybdenum disulphide. As can be seen by referring to FIGS. 2 and 3, the liner 40 provides a continuous bearing surface throughout the straight and curved sections from the power handle 18 to the rotary head 14.

Referring now to FIG. 2, rotary power is delivered to the flexible drive shaft 38 through a centrifugal clutch assembly 42, which is mounted directly on the forward end of a crank shaft 44. The crank shaft 44 is provided with a first threaded section 46 and a smooth bearing section 48 of lesser diameter. The clutch assembly further includes a centrifugal shoe member 50 which is secured in threaded engagement with the threaded shaft section 46. A drum 52 of the clutch is rigidly attached to a coupling sleeve 54 which is rotatably journalled on the smooth shaft section 48. The coupling sleeves 54 terminates in a square drive socket 56 which slidably receives a squared drive head portion 58 of the flexible drive shaft 38. A boss 60 is rigidly attached to and forms a forward portion of the housing 20. The boss 60 is provided with a bore 62 which is concentric with the axis of the crank shaft 44. The extreme end of the boss 60 is provided with threads 64 for engaging a tapered retaining collar 66. Confined in the annulus between the retaining collar and the support housing 26 is a resilient gasket 68 which simultaneously seals the coupling assembly and anchors the support housing 26 to the boss 60.

According to the foregoing arrangement, assembly and disassembly of the upper end of the drive shaft can be easily accomplished simply by unscrewing the retaining collar 66 and withdrawing the drive head 58 from the socket 56. The drive head 58 is preferably dimensioned with respect to the socket 56 to provide a loosely sliding fit. The coupling sleeve 54 is provided with an expansion chamber 70 which receives the extreme end of the drive head 58. According to this arrangement, the flexible drive shaft 38 is free to expand and contract axially without restraint since the drive head is not anchored to the socket. The drive head 58 is preferably square in cross section, and the drive socket 56 is provided with a square bore 72. This permits the drive head 58 to freely extend and retract axially, while also providing overlapping torque transmitting surface areas throughout the range of axial movement of the drive head relative to the socket.

As previously mentioned, the upper coupling assembly 34 attaches the drive shaft assembly 16 to the power handle 18. The flexible drive shaft 38, which is preferably a spiral wound cable as can best be seen in FIG. 4, is crimped with a crimping tool to provide a foresighted drive head 58. The upper end 30 of the tubular support housing 26 is slidably received in a semi-tight fit within the bore 60. The resilient retaining ring 68 is securely attached to the tubular housing 26 and has tooth shaped detents (not shown) which mate with similar detents (not shown) on the boss 60. The retaining collar 66 has an internal shoulder which engages the retaining ring 68, and internal threads 76 which are disposed in threaded engagement with the threaded section 64 of the boss 60.

The retaining collar 66 has exterior, longitudinally extending ribs and grooves to improve hand grip, and also has an elongated bore 78 which relatively closely receives the support housing 26 to lend additional mechanical support.

By partially loosening the collar 66, the tooth shaped detents can be released, and the rotational position of the support housing 26 relative to the power handle assembly 18 may be adjusted to change the position of the cutting head as desired. It will be noted that substantially any implement requiring rotary power can be attached to the power handle by providing mating threads for the threaded section 64 on the boss disposed in the proper relation to a squared drive shaft section to be received in the drive socket 56. In such an implement, inclusion of the extension of the tubular support housing 26 into the bore 78 of the boss may or may not be required, and the toothed detents may also be eliminated where the position of the power handle relative to the implement is not required.

Referring now to FIGS. 1 and 3, the rotary head 14 is mechanically and rotatably coupled to the drive shaft assembly 16 through the lower coupling assembly 36. The lower coupling assembly comprises a tubular shroud 80 which is received in telescoping engagement with the lower straight end section 28 of the support housing 26. The shroud 80 is anchored in place by means of an Allen set screw 82. The shroud 80 is preferably formed of heavy gauge aluminum or steel and is provided with a bore 84 for receiving the straight end section 28. The shroud 80 is therefore interposed between the rotary head and the lower end of the drive shaft assembly, with the shroud being conveniently removably attached to the support housing. The flexible drive shaft 38 is coupled to the spool 22 by a coupling stub 86. The coupling stub 86 is provided with a threaded shank 88 on one end, and a box drive socket 90 on its opposite end. The drive socket 90 is similar in construction with the upper drive socket 56, and includes an expansion chamber 92. A smooth, cylindrical bearing surface 94 is formed along the shank intermediate the threaded end portion and the drive socket 90.

Received in torque transmitting engagement with the drive socket 90 is a squared drive head 96 which is formed on the lower extreme end of the flexible drive shaft 38 by a crimping operation (FIG. 4). The socket 90 is formed with a square bore 98 (FIG. 5) for receiving the drive head 96 in sliding engagement. According to this arrangement, the drive head 96 is free to extend and retract axially into and out of the expansion chamber 92, without restriction, in response to torque variations. According to this preferred arrangement, both the upper and lower extreme ends of the flexible drive shaft 38 are free to expand and contract axially, without interference, while transmitting torque through the overlapping surface areas of the drive head and socket. This relieves the twisting effect caused by torque variations and thereby substantially reduces the flexible drive shaft which can cause premature wear and failure.

The coupling stub 86 is journalled for rotation within the shroud 80 by a pair of roller bearing assemblies 100, 102. The bearing assemblies are identical and include an outer race 104 slidably received within the shroud bore 84, an inner race 106 received around the bearing surface 94 of the coupling stub, and a number of roller balls 108 confined between the inner and outer races. The bearing assemblies 100, 102 are separated by a cylindrical spacer sleeve 110 and the spacer/bearing combination is confined against axial movement within the shroud 80 by snap rings 112, 114. The assembly is further stabilized by a spacer 116 which encircles the lower end of the coupling stub 86, and by a shoulder 118 formed on the upper end of the stub 86. The shoulder 118 is confined in compressive engagement with the inner race of the bearing assembly 102 as a lock nut 120 is torqued against the spacer 116. A dust cover 122 is preferably received between the lock nut and the spacer sleeve 116. The dust cover 122 includes a skirt 124 which is radially spaced from the shroud 80 to permit the dust cover and the coupling stub 86 to rotate without interference.

According to this arrangement, the spool 22 of the rotary head 14 may be connected directly to the coupling stub 86. Additionally, the drive shaft assembly can be rapidly disconnected from the coupling assembly 36 merely by removing the set screw 82 and withdrawing the straight support housing end 28 from the bore 84. Because the drive head 96 is slidably engaged in the socket 90, it slides out of the socket 90 without interference as the support housing is withdrawn. This permits easy inspection or replacement of the flexible drive shaft without requiring special tooling.

The drive shaft assembly 16 is fabricated by first inserting the liner 40 into a suitable length of bendable support housing material 26. The liner is preferably anchored to the support housing by a rivet 126 (FIG. 3). Next the flexible drive shaft 38 is inserted through the liner tube. The resulting assembly of the support housing, liner and flexible drive shaft are then subjected to a standard bending operation, as carried out by conventional tube bending apparatus. The liner provides bending support which enhances the bending operation to produce a smooth, continuous arc in transition between the upper and lower straight sections. The presence of the internal liner also prevents radial collapse and profile distortion at the points of application of the bending force.

After the bending operation has been completed, the upper drive head 58 is inserted into the drive socket 56 and the upper straight end support housing section 30 is inserted into the boss 60 and the retaining collar 66 is tightened onto the boss. The lower coupling assembly 36 is preferably preassembled and is attached to the drive shaft housing 26 by inserting the lower straight end section 28 of the support housing into the bore while turning the coupling stub 86 until the box socket 90 is aligned with the drive head 96. When the lower straight end section is fully inserted, the shroud 80 is turned until the set screw 82 is aligned with a threaded opening in the housing section, and thereafter the set screw is tightened to lock the assembly in place.

The bearings, coupling stub spacers and shroud are so interconnected that the parts are all held in a predetermined relationship whereby the entire lower coupling assembly 36 may be quickly and easily removed in one piece from the drive shaft assembly without disturbing the relationship of the various parts. Additionally, the bearings and the coupling stub 86 may be easily removed for inspection or replacement as needed merely by removing the lock nut 120, dust cover 124 and snap ring 114.

It will be appreciated that because of the continuous bearing surface provided by the liner 40 through the curved transition section 32, the flexible drive shaft 38 may be removed from the drive shaft assembly 16 and replaced easily and rapidly by disassembling only one end of the drive shaft assembly. Because the liner provides a yieldable, low friction bearing surface along the entire length of the support housing, it provides relatively silent operation and substantially increases the life expectancy of the flexible drive shaft.

It will be appreciated that the above illustrated and described invention provides a novel drive shaft assembly which may be used to good advantage for delivering rotary power developed by a power handle for a number of different portable power tool applications. The drive shaft assembly is particularly well suited for driving a flexible line trimmer for cutting vegetation, but it may also be used to good advantage for other uses such as for driving a brush cutter having a rigid blade, and in a lawn edger. The drive shaft assembly may also be used for driving a hedge trimmer, snow blower, power hacksaw, circular saw, chain saw, water pump, or for driving a generator, as examples. The structure of the invention provides a compact, highly efficient synergistic combination of elements which perform a multiplicity of functions, and which simplifies routine maintenance and repair.

Although the invention has been described with reference to a preferred embodiment, it will be appreciated by those skilled in the art that additions, deletions, modifications, substitutions and other changes not specifically described in the illustrated embodiment may be carried out to achieve the objects of the invention and fall within the scope and spirit of the appended claims.

What is claimed is:

1. A power tool comprising:
   a prime mover having a power output shaft;
   a head including a rotary member;
   an elongated, thin walled metal tubular support housing coupled to one end to said prime mover housing and coupled on the opposite end to said head, said tubular support housing having substantially straight end sections inclined with respect to each other and an intermediate section forming a curved transition from one straight end section to the other;
   a flexible drive shaft extending through said straight end sections and said intermediate section;
   a continuous length of tubular nonmetallic bearing liner extending through substantially the entire length of said tubular support housing and disposed in surrounding relationship to and directly engageable with said flexible drive shaft and forming a sole continuous bearing for said flexible drive shaft;
   drive connector means coupling said flexible drive shaft on opposite ends to said power output shaft and said head, respectively, in torque transmitting relationship thereto, said drive connector means comprising coupling means having opposite ends engaged with one end of said flexible drive shaft and with said rotary member in torque transmitting relation, respectively; and
   said coupling means and said flexible drive shaft having mutually engageable coupling socket and a first drive head, respectively, said first drive head being formed on said one end of said flexible drive shaft and being axially movable in said coupling shaft, and said coupling socket and said first drive head having overlapping torque transmitting surfaces to provide for a predetermined range of axial movement of said first drive head relative to said coupling socket, and said drive connector means further comprising a drive socket member coupled to said power output shaft and to the opposite end of said flexible drive shaft, said opposite end of said flexible drive shaft including a second drive head axially movable in said drive socket member, said drive socket member and said second drive head having overlapping torque transmitting surfaces to provide for a predetermined range of axial movement of said second drive head relative to said drive socket member whereby said flexible drive shaft is movable axially over a limited range in said continuous bearing without restriction between said coupling socket and said drive socket member in response to torque variations in said flexible drive shaft.

2. A flexible line trimmer power tool comprising:
   a prime mover having a power output shaft;
   a prime mover housing enclosing said prime mover;
   a rotary head including a spool and a length of flexible line carried by said spool for cutting vegetation;
   an elongated, thin walled metal tubular support housing coupled on one end to said prime mover housing and coupled on the opposite end to said rotary head, said tubular support housing having substantially straight end sections inclined with respect to each other and an intermediate section forming a curved transition from one straight end section to the other;
a flexible drive shaft extending through said straight end sections and said intermediate section;
a continuous length of tubular nonmetallic bearing liner extending through substantially the entire length of said tubular support housing and disposed in surrounding relationship to and directly engageable with said flexible drive shaft and forming a sole continuous bearing for said flexible drive shaft;
drive connector means coupling said flexible drive shaft on opposite ends to said power output shaft and said rotary head, respectively, in torque transmitting relationship thereto, said drive connector means comprising coupling means having opposite ends engaged with one end of said flexible drive shaft and with said rotary head in torque transmitting relation, respectively; and
said coupling means and said flexible drive shaft having mutually engageable coupling socket and a first drive head, respectively, said first drive head being formed on said one end of said flexible drive shaft and being axially movable in said coupling socket, and said coupling socket and said first drive head having overlapping torque transmitting surfaces to provide for a predetermined range of axial movement of said first drive head relative to said coupling socket, and said drive connector means further comprising a drive socket member coupled to said power output shaft and to the opposite end of said flexible drive shaft, said opposite end of said flexible drive shaft including a second drive head axially movable in said drive socket member, said drive socket member and said second drive head having overlapping torque transmitting surfaces to provide for a predetermined range of axial movement of said second drive head relative to said drive socket member whereby said flexible drive shaft is movable axially over a limited range in said continuous bearing without restriction between said coupling socket and said drive socket member in response to torque variations in said flexible drive shaft.

3. The power tool set forth in claim 2 wherein:
said connector means includes a coupling stub member including said coupling socket, said coupling stub member is rotatably mounted on bearing means disposed in a tubular shroud secured to one end of said support housing.

4. The power tool set forth in claim 3 including:
a tubular boss extending from said prime mover housing for supporting the end of said tubular support housing opposite said one end, and said drive socket member is rotatably disposed in coaxial alignment with said boss in engagement with said second drive head.

* * * * *